United States Patent [19]

Koitabashi

[11] Patent Number: 5,396,976
[45] Date of Patent: Mar. 14, 1995

[54] ELECTROMAGNETIC CLUTCH WITH DUST SHIELD

[75] Inventor: Takatoshi Koitabashi, Richardson, Tex.

[73] Assignee: Sanden Corporation, Gunma, Japan

[21] Appl. No.: 155,216

[22] Filed: Nov. 22, 1993

[30] Foreign Application Priority Data

Nov. 26, 1992 [JP] Japan .............. 4-081799 U

[51] Int. Cl.$^6$ ............................................. F16D 27/14
[52] U.S. Cl. .................. 192/84 C; 192/112; 74/609
[58] Field of Search ............ 192/84 C, 84 A, 112; 74/609

[56] References Cited

U.S. PATENT DOCUMENTS

| | | | |
|---|---|---|---|
| 2,620,900 | 12/1952 | Rostu | 192/84 A X |
| 3,036,679 | 5/1962 | Millington et al. | 192/84 C |
| 3,387,689 | 6/1968 | Ovshinsky | 192/84 C X |
| 4,793,457 | 12/1988 | Siewert et al. | 192/112 |
| 4,955,954 | 9/1990 | Onishi et al. | 192/84 C X |
| 5,046,594 | 9/1991 | Kakinuma | 192/84 C |

FOREIGN PATENT DOCUMENTS

| | | | |
|---|---|---|---|
| 60-18624 | 1/1985 | Japan | 192/84 C |
| 63-92829 | 4/1988 | Japan | 192/84 C |
| 63-6225 | 12/1988 | Japan . | |

Primary Examiner—Andrea L. Pitts
Attorney, Agent, or Firm—Baker & Botts

[57] ABSTRACT

An electromagnetic clutch includes a clutch rotor of magnetic material which is rotatably supported on a bearing. An electromagnetic housing extends into an inner hollow space of the rotor. An annular magnetic coil is disposed within an annular hollow space of the electromagnetic housing. A magnetic armature plate faces the rotor and a predetermined axial air gap is formed therebetween. The armature plate is attracted to the rotor when the magnetic coil is energized. The rotor has an annular projection which extends from an axial end thereof. An annular groove is formed on an inner peripheral surface of the projection. A shield member for shielding a front surface of the electromagnetic clutch includes an annular portion, an open end, and a flange portion extending axially from a radial end of the annular portion. The flange portion includes a plurality of connecting members formed thereon for connecting the shield member to the rotor. The shield member is connected to the clutch rotor so that the connecting members of the shield member fit into the annular groove of the annular projection of the rotor. Thus, the electromagnetic clutch is easily assembled and the shield member is easily installed and removed from the assembly when so desired. Further, the shield member resists becoming disconnected or loosened during operation of the clutch assembly.

5 Claims, 5 Drawing Sheets

ELECTROMAGNETIC CLUTCH WITH DUST SHIELD

BACKGROUND OF THE INVENTION

1. Field of the Invention

The invention relates generally to electromagnetic clutches and, more particularly, to an improved dust shield for a compressor clutch assembly.

2. Description of the Prior Art

In a typical compressor clutch assembly, a rotor is continuously driven and the torque is selectively transmitted to the compressor crankshaft by a clutch mechanism. In such a compressor, the clutch assembly is normally located adjacent to the rotor on the side of the rotor opposite the compressor housing. Compressors are often operated in harsh environments, for example, in agricultural and construction machinery such as combines, tractors, or cranes. Compressors are also typically operated in other harsh environments. In these various applications, exposure of the clutch mechanism to dust and other destructive elements is likely to cause premature failure of the clutch components, particularly the clutch pulley bearings.

Some compressors are operated without a clutch pulley cover, thus allowing ambient air to flow uninhibited throughout the clutch assembly. Efforts to prevent this air flow, with its associated dirt and debris, have included attaching a pulley cover to a front surface of the pulley. Such a cover is typically screwed or bolted on, thus requiring a pulley diameter greater than that of the clutch armature to accommodate screw holes. This increases the size of the compressor assembly unnecessarily. Covers which screw or bolt on are also more difficult to assemble and, therefore, increase the cost of manufacturing the compressor clutch assembly.

Inventions in the prior art have been designed in an attempt to alleviate the above problems by providing a pulley cover which attaches to the clutch pulley without the use of screws or bolts. For example, U.S. Pat. No. 4,793,457 discloses a safety shield for a friction clutch mechanism. A resilient dust shield is secured to the rotor by a snap fitting.

Referring to FIG. 7, a prior art clutch assembly is depicted. A dust shield 50 attaches to the outer rim surface 34 of clutch pulley 24, thereby allowing the diameters of pulley 24 and clutch armature 44 to be substantially the same. Pursuant to the prior art, dust shield 50 attaches to pulley 24 and encloses front surface 30. Dust shield 50 is a cylindrical hollow part including an open end and having a diameter dependent upon the pulley to which the shield will be attached.

Referring further to FIG. 8, an annular land 68 on outer rim surface 34 is defined by annular groove 66 and front surface 30 of pulley 24. Annular land 68 cooperatively engages with annular recess 60 of dust shield 50. Annular stop surface 62 of dust shield 50 abuts a front surface 30 of pulley 24 to provide a seal between shield 50 and pulley 24.

This arrangement has several disadvantages. For example, when the clutch rotates with a high speed, dust shield 50 can easily become disconnected from outer rim surface 34 of clutch pulley 24. Also looseness in the assembly can be created because the centrifugal force associated with high speed rotation can cause the open end of shield 50 to expand radially outward. This looseness typically causes vibration and noise within the clutch assembly.

SUMMARY OF THE INVENTION

It is an object of the present invention to provide an electromagnetic clutch which is easily installed in and removed from a compressor assembly, thereby lowering service and repair costs.

It is another object of the present invention to provide an electromagnetic clutch with an improved dust shield which reduces noise and vibration.

According to the present invention, a first rotatable member of magnetic material is rotatably supported on a bearing. The bearing is mounted on a mount member. The first rotatable member includes an outer annular cylindrical portion, an inner annular cylindrical portion, and an axial end plate connecting the outer annular cylindrical portion and the inner annular cylindrical portion. The outer and inner annular cylindrical portions and the axial end plate define an inner hollow space. An electromagnetic housing is fixedly secured to the mount member and extends within the inner hollow space. The electromagnetic housing is formed with a generally U-shaped cross-section which defines an annular hollow space. An annular magnetic coil is fixedly disposed within the annular hollow space of the electromagnetic housing. The second rotatable member includes a hub secured thereon. A magnetic armature plate is supported on the hub. The magnetic armature plate faces the first rotatable member with a predetermined axial air gap therebetween and has limited axial movement. The magnetic armature plate is attracted to the first rotatable member when the annular magnetic coil is energized. The outer annular cylindrical portion includes an annular projection extending from an outer axial end thereof. The annular projection includes an annular groove formed on a peripheral surface thereof. A shield member for shielding a front surface of the electromagnetic clutch includes an annular portion, an open end, and a flange portion extending axially from a radial end of the annular portion. The flange portion includes a plurality of connecting members formed thereon for connecting the shield member to the first rotatable member, so that the connecting members of the shield member fit into the annular groove of the annular projection of the first rotatable member.

The foregoing embodiment may comprise additional features including, but not limited to, the following.

The flange portion of the shield member may have an annular concave portion formed thereon between the connecting members and the annular portion of the shield member. Among other advantages, this concave portion may allow easy removal of the shield member by inserting an instrument, e.g. a screw driver, into the concave portion and prying the shield member away from the clutch assembly.

Further objects, features, and advantages of the present invention will be understood from the detailed description of the preferred embodiments of the present invention with reference to the appropriate figures.

DETAILED DESCRIPTION OF THE PREFERRED EMBODIMENTS

Figure 1:
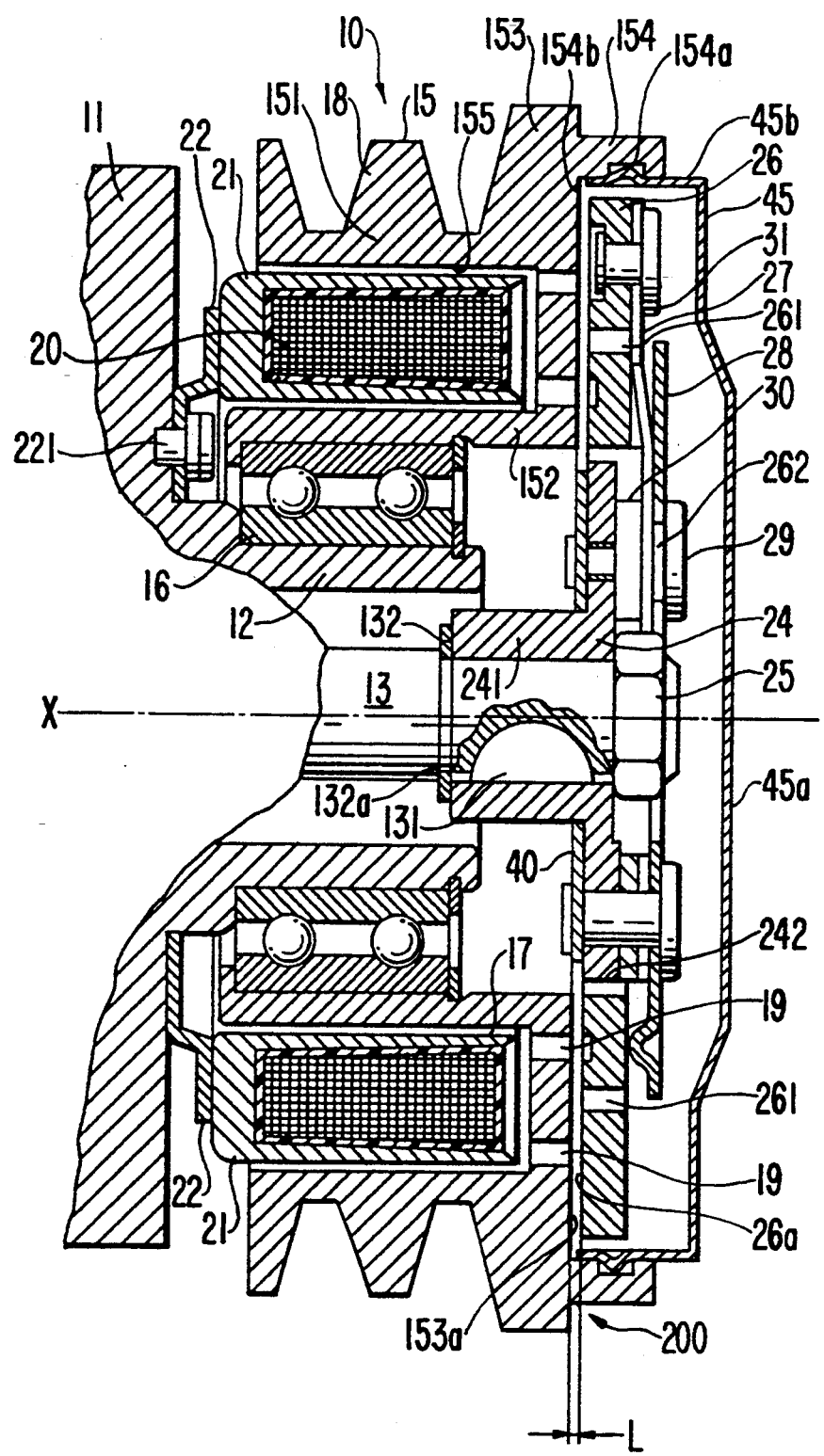
FIG. 1 is a cross-sectional view of an electromagnetic clutch according to a first embodiment of the present invention.

Referring to FIG. 1, an electromagnetic clutch assembly 10 is provided according to a first embodiment of the present invention. Clutch assembly 10 may be coupled to a refrigerant compressor in an automobile air conditioning system (not shown). For purposes of explanation only, the right side of FIG. 1 will be referred to as the forward or front end, while the left side of FIG. 1 will be referred to as the rearward or rear end. A clutch rotor 15, an electromagnetic coil 20, a housing 21 and a bearing 16 generally constitute the driving mechanism of the electromagnetic clutch assembly. Hub 24, leaf springs 27, a stopper plate 28, and an annular armature plate 26 generally constitute the driven mechanism 200 of the electromagnetic clutch assembly.

Clutch assembly 10 is coupled to a compressor housing 11 which is provided with a tubular extension 12 surrounding a compressor drive shaft 13. Drive shaft 13 is rotatably supported within housing 11 along horizontal axis X—X by bearings (not shown). Hub 24, armature plate 26, and clutch rotor 15 rotate about axis X—X.

Clutch rotor 15 is made of a magnetic material, such as steel, and comprises an outer annular cylindrical portion 151, an inner annular cylindrical portion 152, and an axial end plate portion 153 which connects the outer and inner portions 151 and 152 at their forward ends. Thus, an annular U-shaped cavity 155 is defined by portions 151, 152 and 153. A plurality of generally V-shaped grooves 18 are provided on the outer peripheral surface of outer annular cylindrical portion 151 for receiving a belt (not shown) which couples the rotor 15 to the output of an automobile engine (not shown). Rotor 15 is rotatably supported on tubular extension 12 of compressor housing 11 by bearing 16 which surrounds the outer surface of tubular extension 12.

Axial end plate portion 153 includes one or more concentric slits 19 which are disposed on one or more concentric circles. Slits 19 define a plurality of annular or arcuate magnetic pieces with the surface of the poles on axial end plate portion 153.

Electromagnetic coil 20 is disposed in annular cavity 155 of clutch rotor 15 to supply a magnetic flux (not shown) for attracting armature plate 26 to axial end plate portion 153. Coil 20 is contained within an annular electromagnetic housing 21. Housing 21 has a generally U-shaped cross-section and is affixed, e.g. by welding, to a supporting plate 22, which is secured to the axial end surface of housing 11 by a plurality of rivets 221. A relatively small air gap is maintained between housing 21 and rotor 15.

Hub 24 comprises a tubular member 241 which is secured tightly on the terminal end portion of the drive shaft 13, e.g. by forcible insertion. Flange portion 242 extends radially from the front end of tubular member 241 and may be integrally formed with tubular member 241 or formed separately and affixed by a known securing method such as welding. Relative rotation between hub 24 and drive shaft 13 is prevented by a key-keyhole mechanism 131 provided at the terminal end portion of drive shaft 13. Hub 24 is further secured to drive shaft 13 by a nut 25 which is threaded on the terminal end portion of drive shaft 13.

Annular shim 132 is disposed between the rearward end of tubular member 241 of hub 24 and an annular ridge 132a. Ridge 132a is formed on the outer peripheral surface of the terminal end portion of drive shaft 13. The shim and ridge arrangement allow for the adjustment of an air gap "L" which exists between annular armature plate 26 and axial end plate portion 153 of rotor 15.

Annular armature plate 26 is made of a magnetic material, is concentric with hub 24, and has a friction surface 26a which faces the friction surface 153a of axial end plate portion 153 of rotor 15. Armature plate 26 has a plurality of elongated apertures 261 disposed on a concentric circle and is coupled to flange portion 242 of hub 24 by a plurality of leaf springs 27. Each leaf spring 27 is fixed at a first end thereof to the forward surface of armature plate 26 by a rivet 31 and at a second end thereof to the rearward surface of stopper plate 28. The second ends of leaf springs 27 are secured to each other and to flange portion 242 through spacing member 30 by rivets 29. Accordingly, armature plate 26 may move relative to hub 24 along axis X—X upon the deflection of leaf springs 27.

Thus, when electromagnetic coil 20 is energized, armature plate 26 is magnetically attracted to axial end plate portion 153 of rotor 15. Armature plate 26 will move rearwardly along axis X—X so that friction surface 26a engages friction surface 153a. This engagement will transmit the engine driven rotation of clutch rotor 15 through leaf springs 27 and hub 24 to drive shaft 13.

Axial end plate portion 153 includes projection 154 extending from an axial end thereof. Projection 154 includes annular groove 154a formed on a radial inner peripheral surface 154b.

Figure 2:
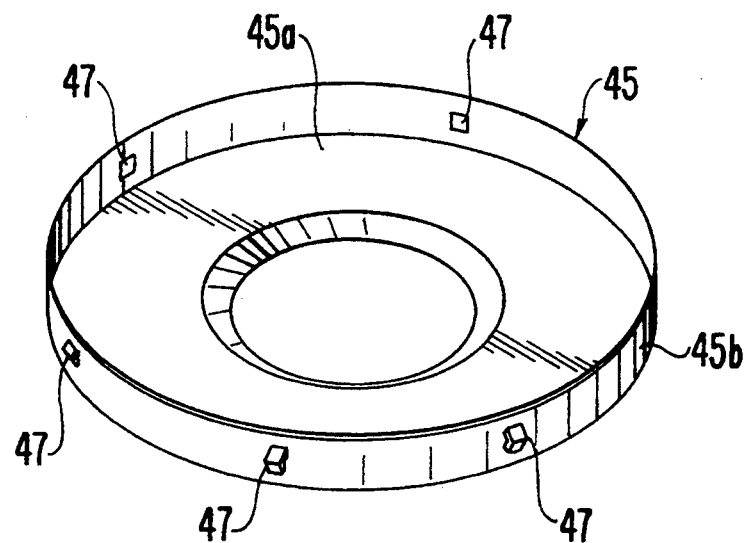
FIG. 2 is a perspective view of a dust cover for an electromagnetic clutch according to the first embodiment of the present invention.

As best seen in FIG. 2, dust cover 45 is a cylindrical hollow part including an open end and having a diameter dependent upon clutch rotor 15 to which dust cover 45 is attached. Dust cover 45 includes annular portion 45a and annular flange portion 45b extending axially from a radial end of annular portion 45a. Annular flange portion 45b includes a plurality of cantilever ribs 47 which are formed on a peripheral surface thereof and are substantially equally spaced apart.

Dust cover 45 attaches to clutch rotor 15 so that each resilient cantilever rib 47 of dust cover 45 securely fits into annular groove 154a of projection 154. Annular groove 154a is formed to have a generally rectangular-shaped or U-shaped cross-section.

Figure 3:
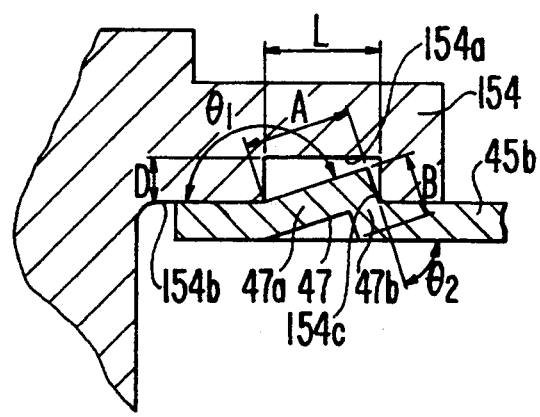
FIG. 3 is an enlarged fragmentary sectional view of the electromagnetic clutch shown in FIG. 1.

Referring to FIG. 3, each cantilever rib 47 of dust cover 45 has a first rib portion 47a bent radially outward and second rib portion 47b bent radially inward. A displacement angle between first rib portion 47a and flange portion 45b is defined to be $\theta_1$. A displacement angle between second rib portion 47b and flange portion 45b is defined to be $\theta_2$. Angles $\theta_1$ and $\theta_2$ are further defined by the following inequalities:

$$90° < \theta_1 < 180° \quad (1)$$

$$0° < \theta_2 < 90° \quad (2)$$

A relationship between the shape of annular groove 154a and the shape of each cantilever rib 47 is defined in order to prevent dust cover 45 and rotor 15 from disconnecting and to prevent the engagement between dust cover 45 and rotor 15 from loosening. This relationship is defined by the following inequalities:

$$A \sin \theta_1 > D \quad (3)$$

$$-A \cos \theta_1 + B \sin \theta_2 > L \quad (4)$$

L is the axial width of annular groove 154a. D is the radial depth of annular groove 154a. A is the outer length along first rib portion 47a. B is the outer length along second rib portion 47b.

When dust cover 45 attaches to clutch rotor 15, the center of dust cover 45 is aligned axially with the center of annular projection 154. Annular flange portion 45b moves toward clutch rotor 15 and inserts radially inside of annular projection 154. When cantilever ribs 47 begin to contact with inner peripheral surface of annular projection 154, ribs 47 are pushed into the radial inside of clutch rotor 15 and angle $\theta_1$ increases and approaches 180°. Thereafter, cantilever ribs 47 reach annular groove 154a and angle $\theta_1$ returns to a predetermined value due to the restoring force of the material of which dust cover 45 is constructed.

The amount of force required to insert dust cover 45 into rotor 15 is determined by the size of angle $\theta_1$. As the predetermined value of angle $\theta_1$ is decreased, the force necessary to attach dust cover 45 to rotor 15 increases. Further, as the predetermined value of angle $\theta_2$ is decreased, the force required to disconnect dust cover 45 from clutch rotor 15 decreases.

Accordingly, once dust cover 45 is inserted into rotor 15 such that ribs 47 fit within groove 154a, dust cover 45 is securely affixed to projection 154. Preferably, any looseness or chance of dust cover 45 disconnecting from rotor 15 is prevented because second rib portion 47b engages a forward edge portion 154c of annular groove 154a and a reaction force perpendicular to the outer surface of second rib portion 47b biases portion 47b against edge portion 154c. Preferably, this engagement is maintained even if dust cover 45 is drawn axially forward and opposite from the direction in which cover 45 is inserted into rotor 15.

When the clutch assembly rotates with a high speed, dust cover 45 is prevented from disconnecting from clutch rotor 15 or becoming loose because the centrifugal force caused by the rotation biases flange portion 45b radially outward. Further, angles $\theta_1$ and $\theta_2$ can be designed to be the optimal values necessary to decrease the force required to attach dust cover 45 to clutch rotor 15 and concurrently prevent the engagement between dust cover 45 and rotor 15 from breaking or becoming loosened after insertion.

Figure 4:
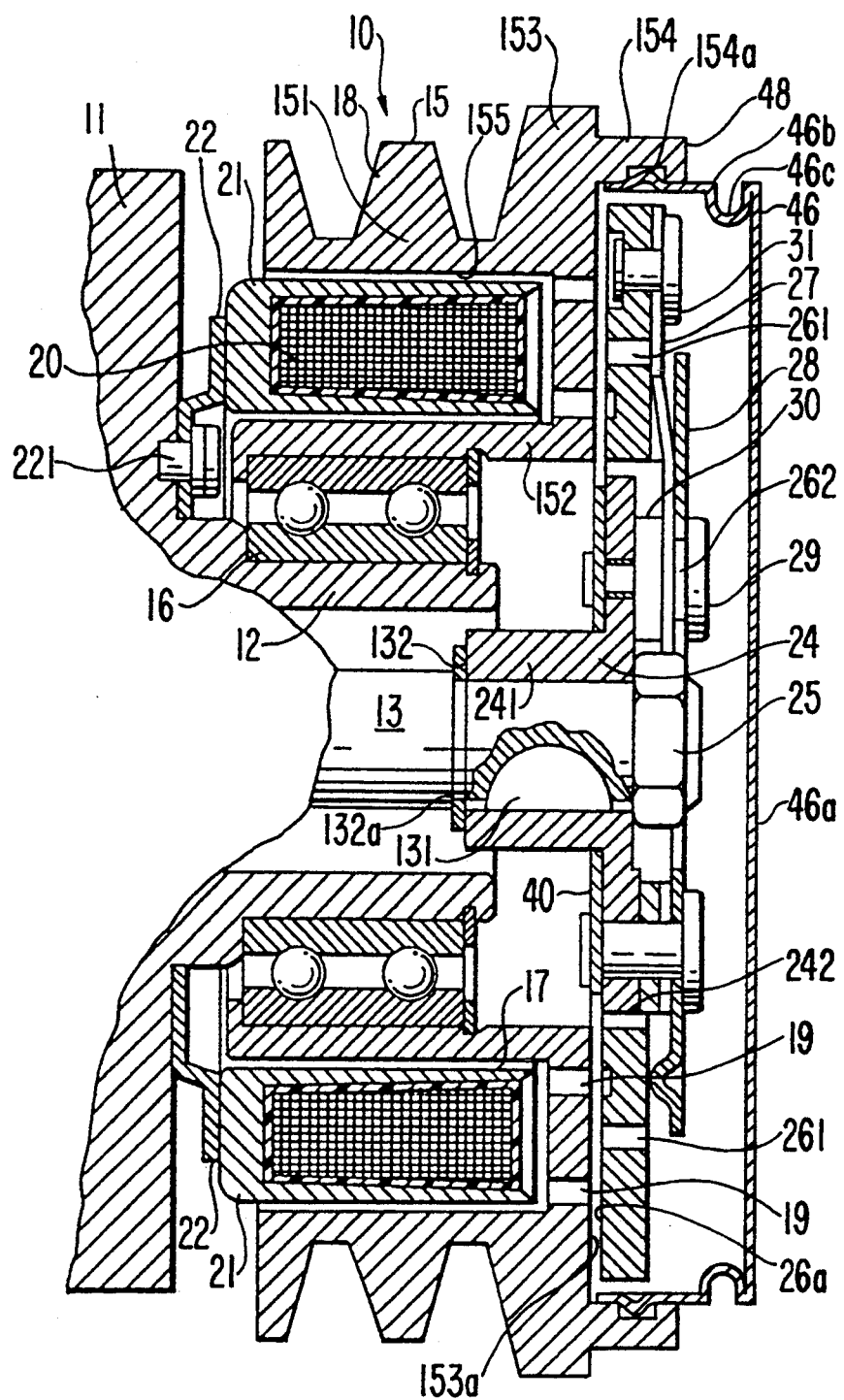
FIG. 4 is a cross-sectional view of an electromagnetic clutch according to a second embodiment of the present invention.

Referring to FIG. 4, an electromagnetic clutch assembly 10 is provided according to a second embodiment of the present invention. A dust cover 46 includes annular concave portion 46c formed on annular flange portion 46b between annular portion 46a and cantilever ribs 48. Concave portion 46c is preferably formed by any suitable manufacturing process such as, for example, shaping in a metal press.

Figure 5:
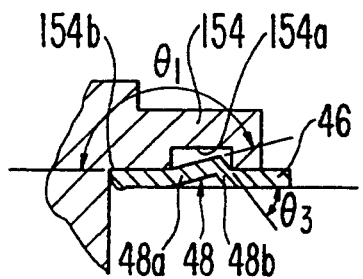
FIG. 5 is an enlarged fragmentary sectional view of the electromagnetic clutch shown in FIG. 4.
Figure 6:
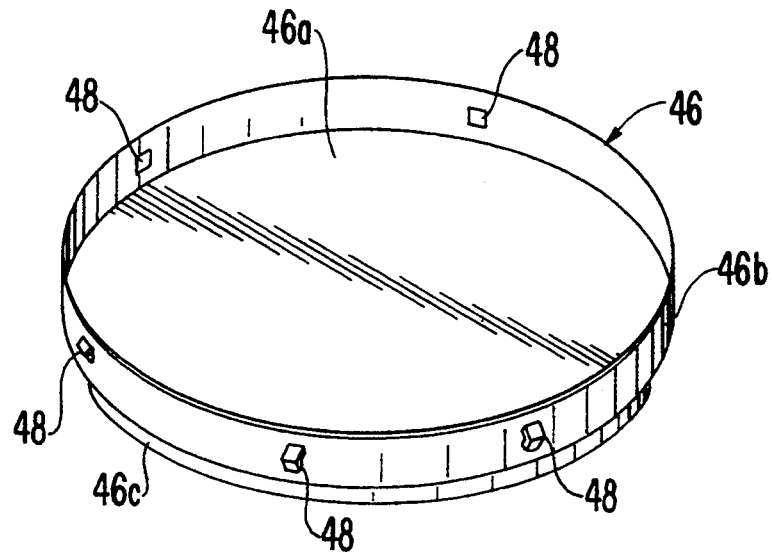
FIG. 6 is a perspective view of a dust cover for an electromagnetic clutch according to the second embodiment of the present invention.
Figure 7:
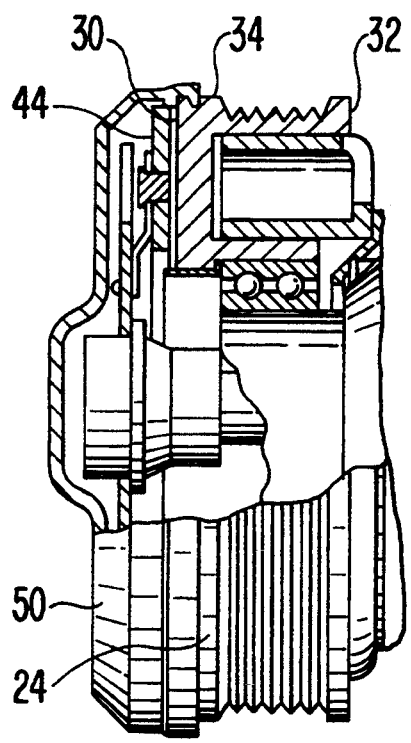
FIG. 7 is a cross-sectional view of an electromagnetic clutch according to the prior art.
Figure 8:
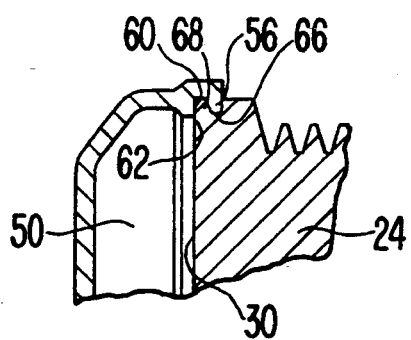
FIG. 8 is an enlarged fragmentary sectional view of the electromagnetic clutch shown in FIG. 7.

As best seen in FIG. 6, flange portion 46b of dust cover 46 includes a plurality of cantilever ribs 48 which are formed on a peripheral surface thereof and are substantially equally spaced apart. Referring to FIG. 5, each rib 48 has a first rib portion 48a bent radially outward and second rib portion 48b bent radially inward. A displacement angle between second rib portion 48b and annular flange portion 46b is defined to be $\theta_3$.

Angle $\theta_3$ is designed to be smaller than $\theta_2$ in the first embodiment described above. As a result, the reaction force which biases second rib portion 48b against edge portion 154c is smaller than that of the first embodiment. Dust cover 46 can be easily disconnected from clutch rotor 15 by prying open the cover/rotor assembly. This can be accomplished, for example, by inserting the blade of a screw driver (not shown) into annular concave portion 46c and prying cover 46 away from rotor 15. This embodiment of the present invention has other advantages which are accomplished in a manner similar to that of the first embodiment.

Although the present invention has been described in connection with the foregoing preferred embodiments, the invention is not limited thereto. It will be easily understood by those of ordinary skill in the art that variations and modifications can be easily made within the scope of this invention. Accordingly, the scope of the present invention is not to be limited to the embodiments and features disclosed herein, but is to be determined by the claims which follow.

I claim:

1. An electromagnetic clutch comprising:
   a first rotatable member of magnetic material rotatably supported on a bearing, said bearing mounted on a mount member, said first rotatable member including an outer annular cylindrical portion, an inner annular cylindrical portion, and an axial end plate connecting said outer annular cylindrical portion and said inner annular cylindrical portion, said outer annular cylindrical portion including an annular projection extending from an outer axial end thereof, said annular projection including an annular groove formed on an inner peripheral surface thereof, said outer and inner annular cylindrical portions and said axial end plate defining an inner hollow space;
   an electromagnetic housing fixedly secured to said mount member and extending within said inner hollow space, said electromagnetic housing being formed with a generally U-shaped cross section, whereby an annular hollow space is defined therein;
   an annular magnetic coil fixedly disposed within said annular hollow space of said electromagnetic housing;
   a second rotatable member having a hub secured thereon;
   a magnetic armature plate supported on said hub, said magnetic armature plate facing said first rotatable member with a predetermined axial air gap therebetween and having limited axial movement, said magnetic armature plate being attracted to said first rotatable member when said annular magnetic coil is energized;
   shielding means for shielding said electromagnetic clutch including an annular portion, an open end, and an annular flange portion extending axially from a radial end of said annular portion; and a plurality of connecting means formed on said annular flange portion of said shielding means for connecting said shielding means to said first rotatable member, so that said plurality of connecting means fit into said annular groove of said annular projection of said first rotatable member.

2. The electromagnetic clutch of claim 1, wherein said connecting means comprises a plurality of resilient rib members, each of said resilient rib members formed from a cutout portion of said annular flange portion of said shield means and formed so as to fit into said annular groove of said annular projection of said first rotatable member.

3. The electromagnetic clutch of claim 2 wherein each of said resilient rib members comprises a first rib portion bent radially outward and a second rib portion bent radially inward.

4. The electromagnetic clutch of claim 1, wherein a cross-sectional plan of said annular groove has a generally rectangular shape.

5. The electromagnetic clutch of claim 1, wherein said shielding means includes an annular concave portion formed on said annular flange portion between said connecting means and said annular portion.

* * * * *